United States Patent [19]

Kuriyama et al.

[11] Patent Number: 5,087,869
[45] Date of Patent: Feb. 11, 1992

[54] PROTECTIVE CIRCUIT IN A DEVICE FOR REDUCING VIBRATIONS OF A VEHICLE BODY

[75] Inventors: Shigeru Kuriyama, Katsuta; Yozo Nakamura, Ibaraki; Yuji Maeda, Katsuta; Kenichi Nakamura, Katsuta; Keiichi Mashino, Katsuta; Yuzo Kadomukai, Ibaraki; Masao Fukushima, Machida; Kei Murakami, Zama, all of Japan

[73] Assignees: Hitachi, Ltd., Tokyo; Nissan Motor Co. Ltd., Yokohama, both of Japan

[21] Appl. No.: 645,610

[22] Filed: Jan. 25, 1991

[30] Foreign Application Priority Data

Jan. 27, 1990 [JP] Japan ..................... 2-16347

[51] Int. Cl.$^5$ ................. F02B 75/06; F02N 11/04; H02P 9/10; H02J 7/14
[52] U.S. Cl. ................... 322/15; 123/192 B; 320/64; 322/23; 322/58
[58] Field of Search ............ 322/14, 15, 233, 58, 322/29; 123/192 B, 435, 339; 320/64

[56] References Cited

U.S. PATENT DOCUMENTS

| | | | |
|---|---|---|---|
| 3,943,408 | 3/1976 | Jakobs et al. | 322/28 X |
| 4,851,757 | 7/1989 | Zwicky et al. | 322/58 |
| 4,982,707 | 1/1991 | Maeda et al. | 123/192 B |

FOREIGN PATENT DOCUMENTS 1184079 3/1970 United Kingdom .

Primary Examiner—R. J. Hickey
Attorney, Agent, or Firm—Antonelli, Terry, Stout & Kraus

[57] ABSTRACT

The present invention relates to an electrical protective circuit, used when abnormality occurs, in a vibration suppressing apparatus which changes the load torque on a generator such as an alternator fixed on the engine to generate an angle moment on the generator body to cancel rough idling engine vibrations to suppress vehicle body vibrations due to the rough idling. In the inventive vibration suppressing apparatus, a generator is fixed on the engine which generator includes a voltage regulator to control a field winding current such that a fixed voltage is output to a battery. The generation of engine rough idling is detected on the basis of either a change in the engine speed or a change in the engine vibrations. If rough idling is detected, a high voltage circuit is connected to the field winding to increase the field winding current and hence the load torque on the generator. In the inventive protective circuit, the battery voltage is compared with a predetermined reference value when no rough idling is detected. If the battery voltage exceeds the reference value, a changeover signal is generated and the high voltage circuit is disconnected from the field winding in response to the changeover signal.

5 Claims, 4 Drawing Sheets

PROTECTIVE CIRCUIT IN A DEVICE FOR REDUCING VIBRATIONS OF A VEHICLE BODY

BACKGROUND OF THE INVENTION

The present invention relates to an electronical protective circuit in a device for reducing possible vibrations of a vehicle body due to rough idling of an engine of the vehicle.

Conventionally, in the field of automobile techniques, various techniques are proposed which concern a reduction in the vibrations of the vehicle body due to fluctuations of the engine torque. For example, in Unexamined Japanese Publication JP-B-62-31172 of Japanese Patent Application No. 57-68316 filed by Toyo Cogyo Co., Ltd. on Apr. 22, 1982, a technique is proposed which suppresses vibrations due to periodic fluctuations of the torque generated on the crankshaft synchronously with the combustion stroke of the engine. In this technique, a periodic increase in the torque of the combustion stroke of the engine is detected, a larger field current is caused to flow through the field coil of an alternator to increase the load torque on the alternator to thereby suppress an increase in the torque of the engine and hence reduce engine vibrations and vehicle body vibrations.

The vehicle body vibrations include periodic torque fluctuations due to intermittent combustion strokes of the engine as mentioned above as well as irregular combustion generated during idling to be described below.

Rough idling is likely to occur when the load changes rapidly, for example, when engine speed changes from high speed operation to idling in which case combustion is likely to become unstable and hence when combustion chamber pressure is not sufficient. The irregular combustion rapidly reduces the engine speed. Therefore, the engine is greatly swung in the direction in which the engine rotates around the output shaft (or in the rolling direction). Thus, if the engine is of vertical type like an FR (Front Engine Rear Drive) vehicle, engine vibrations are transmitted through the mount to the vehicle body to thereby cause abnormal vibrations. The body vibrations due to rough idling are different in generative mechanism from periodic vibrations due to engine combustion stroke as mentioned above and are generated irregularly, so that the device for suppressing periodic torque fluctuations of the engine mentioned above cannot eliminate such problems. Since the frequency of the vehicle body vibrations due to rough idling is low, for example, 5-8 Hz, reduction of the vibrations using a mechanical system of a dynamic damper is not practical because the very large-sized damper is required.

A circuit which generates a torque in the alternator body (stator) by increasing the field current in the alternator includes a combination of other electric circuits and elements and a voltage regulator for regular generation control, so that a protective circuit is required which maintains a normal generating function is required even when an abnormality is produced in those additional circuits.

SUMMARY OF THE INVENTION

It is an object of the present invention to provide an electrical protective circuit, used when abnormality occurs, in a vibration suppressing apparatus which changes the load torque on a generator such as an alternator fixed on the engine to generate an angle moment on the generator body to cancel rough idling engine vibrations to suppress the resulting vehicle body vibrations.

In the inventive vibration suppressing apparatus, a generator which includes a voltage regulator to control a field winding current such that a fixed voltage is output to a battery is fixed on the engine. The generation of engine rough idling is detected on the basis of either a change in the engine speed or a change in the engine vibrations. If rough idling is detected, a high voltage circuit is connected to the field winding to increase the field winding current and hence the load torque on the generator. In the inventive protective circuit, the battery voltage is compared with a predetermined reference value when no rough idling is detected. If the battery voltage exceeds the reference value, a changeover signal is generated and the high voltage circuit is disconnected from the field winding in response to the changeover signal.

DESCRIPTION OF THE PREFERRED EMBODIMENTS

Figure 1:
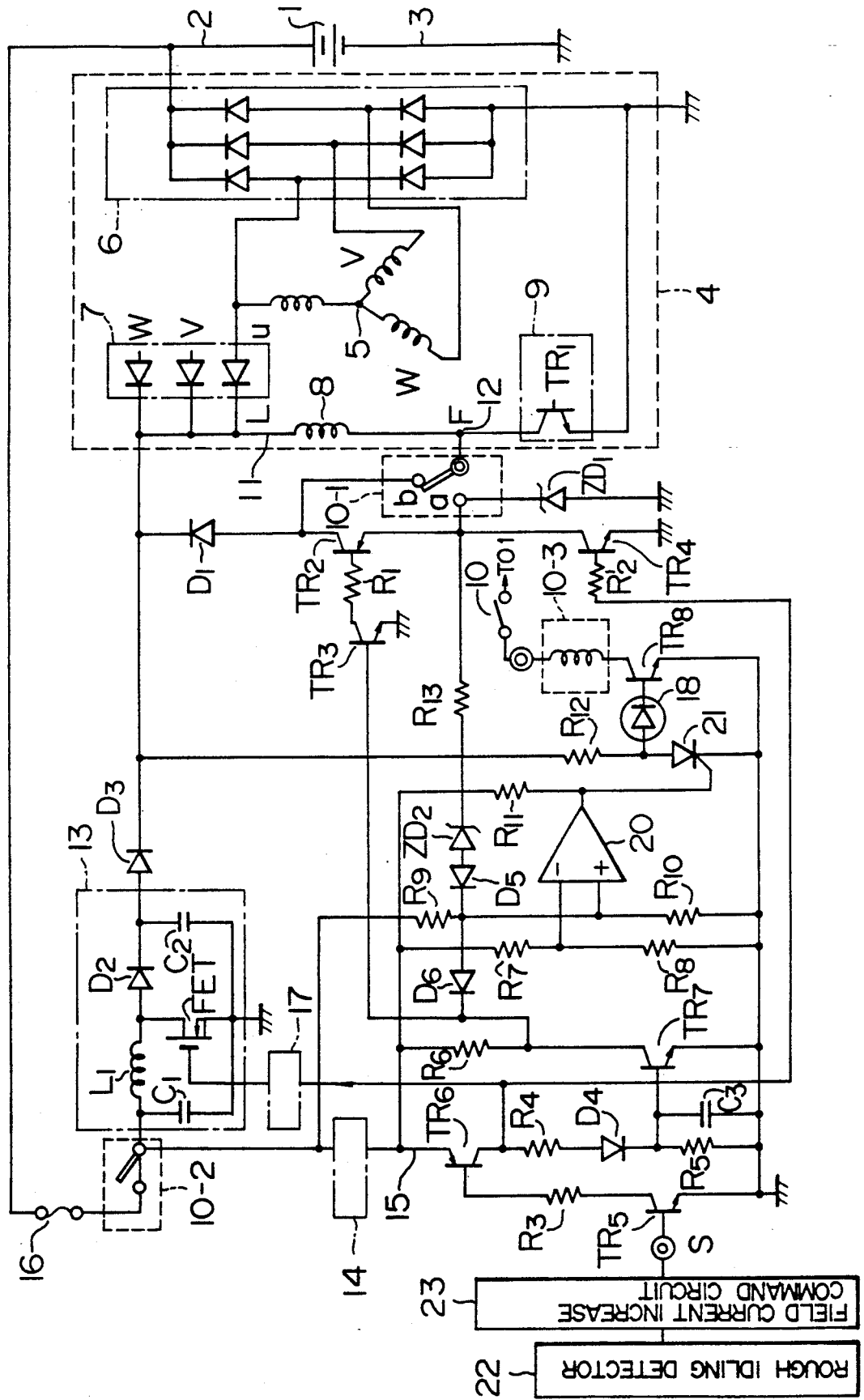
FIG. 1 is a circuit diagram indicative of the structure of an embodiment of a vehicle body vibration reducing apparatus and a protective circuit therefor according to the present invention.

The inventors have proposed a technique for reducing vehicle body vibrations due to irregular rough idling of the engine. The present invention provides a protective circuit for a vehicle body vibration reducing apparatus such as that disclosed in a U.S. co-pending application Ser. No. 485,958 filed on Feb. 21, 1990. The vehicle body vibration reducing apparatus to which the present invention is applied has the following functions and operates as follows.

When rough idling of the engine is detected from fluctuations of the idling speed, a signal is generated which commands an increase in the current flowing through the field coil of an alternator. In response to this command, a switching element is incorporated which supplies an increasing current to the field coil to render the switching element conductive at appropriate timing to temporarily increase the field coil current. In response to an increase in the field coil current, the load torque on the alternator increases. Fluctuations (increase) of the load torque exert a mechanical force on the alternator stator by reaction to thereby cause engine vibrations because the alternator body is fixed securely to the engine. However, if timing is set such that the engine vibrations due to an increase in the load torque on the alternator are in reverse phase relationship to engine vibrations due to the rough idling, the vibrations are canceled by each other and the vibrations due to the rough idling are suppressed, thus, engine vibrations due to an increase in the load torque on the alternator do not appear. It is preferable that, usually, an increase in the load torque on the alternator which suppresses engine vibrations due to such rough idling occurs around the first ½ period of engine vibrations generated by rough idling.

When a vehicle body vibration reducing apparatus for reducing vehicle vibrations due to rough idling as mentioned above is put to practical use, an electrical protective circuit mentioned below will be required.

For example, a field coil current amplifier for the vehicle body vibration reducing apparatus uses a switching element to be set so as to operate in response to a command to increase the field coil current when rough idling is detected. When the switching element fails and short-circuits, an increasing current flows through the field coil to excessively increase power generated by the alternator to overcharge the battery voltage to thereby impair the battery and other electrical devices even if no rough idling is detected (even in a normal case when no command signal to increase the field coil current is given).

Usually, in order to maintain the voltage generated by the alternator at a constant value, a voltage regulator turns on and off the field coil current in the alternator, so that a free wheel diode circuit is connected in parallel with the field coil to absorb a surge voltage generated in the field coil. When an increasing current flows through the field coil to reduce vehicle body vibrations, the free wheel diode circuit is temporarily interrupted to attenuate a large surge voltage produced after the field coil increasing current flows, using a surge absorber such as a Zener diode, and the free wheel diode is again rendered conductive to protect the same.

In this case, if the switching element to interrupt the free wheel diode circuit is opened due to its failure even if no field coil increasing current flows (when no rough idling is generated), the free wheel diode does not function, so that the voltage across terminals of the voltage regulator rises to the blocking voltage of the Zener diode. The Zener diode is heated due to high frequency of such blocking and fails at last. An increase in the frequency of application of high voltage to the voltage regulator accelerates deterioration of the parts of the voltage regulator.

The present invention is made in view of the above problems. It is an object of the present invention to provide a high reliability vehicle body vibration reducing apparatus which has a protective circuit for maintaining the proper charging function of the alternator thereof even if the field current increasing circuit or free wheel diode circuit of the alternator fails.

When the protective circuit of the embodiment of the present invention is in a normal state, a switching element of the field coil current increasing circuit (high voltage circuit) of the alternator is rendered conductive only when rough idling is detected to thereby temporarily increase the load torque on the alternator to reduce vehicle body vibrations.

If the switching element should short-circuit, and no rough idling is generated, or the battery voltage is controlled by a normal voltage regulator, the field coil, current increases through the switching element and the battery voltage increases. In that case, the battery voltage is detected, and it is determined whether the battery voltage exceeds a predetermined value (for example, of 15 volts) or not. If so, the switching element of the field current increasing circuit is disconnected from the field coil of the alternator by the action of relays.

Even if the switching element of the field current increasing circuit is disconnected from the alternator, as mentioned above, the function of the voltage regulator of the alternator is ensured because the voltage regulator is connected in parallel with the switching element. Therefore, the alternator operates normally and maintains the battery voltage normal even if the field current increase circuit fails.

According to a protective circuit of a second embodiment of the present invention, if the circuit of the vehicle body vibration reducing apparatus is normal and no rough idling occurs, surge voltages in the field coil are absorbed by the free wheel diode. If rough idling occurs, the field coil current increasing circuit is supplied with an electric current through the switching element to increase the field coil current temporarily and to actuate the switching circuit to interrupt the free wheel diode circuit and to cause a surge absorber (for example, of Zener diode) used in place of the switching element to attenuate the surge due to the flow of the increasing current through the field coil.

After the surge attenuation, the free wheel diode is reconnected to function.

If the free wheel diode interrupting element is left open due to its failure, the free wheel diode does not function at a normal time when no rough idling occurs, so that the voltage across the terminals of the voltage regulator rises. In the second embodiment, the voltage across the terminals of the voltage regulator is detected. If the voltage is determined to exceed a predetermined value, the field coil is disconnected from the surge absorber by the action of the relays to short-circuit the diode with the field coil. Therefore, even if the switching element to interrupt the diode circuit is left open, the free wheel diode is forcedly connected to the field coil by jumping the interrupting switching element. As a result, the proper function of the diode is exhibited to thereby prevent the voltage regulator terminal voltage from exceeding the predetermined value and hence to prevent deterioration of the regulator. Since the surge absorber used in place of the free wheel diode is also disconnected from the field coil and voltage regulator due to the relay operation, the situation in which high voltage is frequently applied to the surge absorber is avoided to thereby prevent breakage of the absorber. Therefore, even if the switching element to interrupt the free wheel diode fails, the proper charging function of the alternator is ensured.

A protective circuit of a third embodiment of the present invention includes all the components of the first and second embodiments such that it operates as mentioned above to thereby ensure the proper function of the alternator at all times even under abnormal conditions where the switching element of the field coil current increasing circuit in the vibration reducing apparatus short-circuits or the switching element to interrupt the free wheel diode circuit is opened.

In the present embodiment, if either the battery voltage or the terminal voltage of the voltage regulator exceeds its corresponding predetermined value when no rough idling occurs, the relays are operated such that the switching element of the field coil current increasing circuit and the surge absorber (different from the free wheel diode circuit) are disengaged from the field coil of the alternator and the voltage regulator, and that the free wheel diode is short-circuited with the field coil. Thus the alternator maintains its normal function.

If the electrical circuits used in these vehicle body vibration reducing apparatus are arranged to be connected removably to the electrical circuit of the alternator through connectors, they can optionally be attached in accordance with the user's demand.

The embodiments of the present invention will be described hereinafter with reference to the drawings.

FIG. 1 is a circuit diagram of a vehicle body vibration reducing apparatus having a protective circuit of a first embodiment of the present invention.

Figure 2:
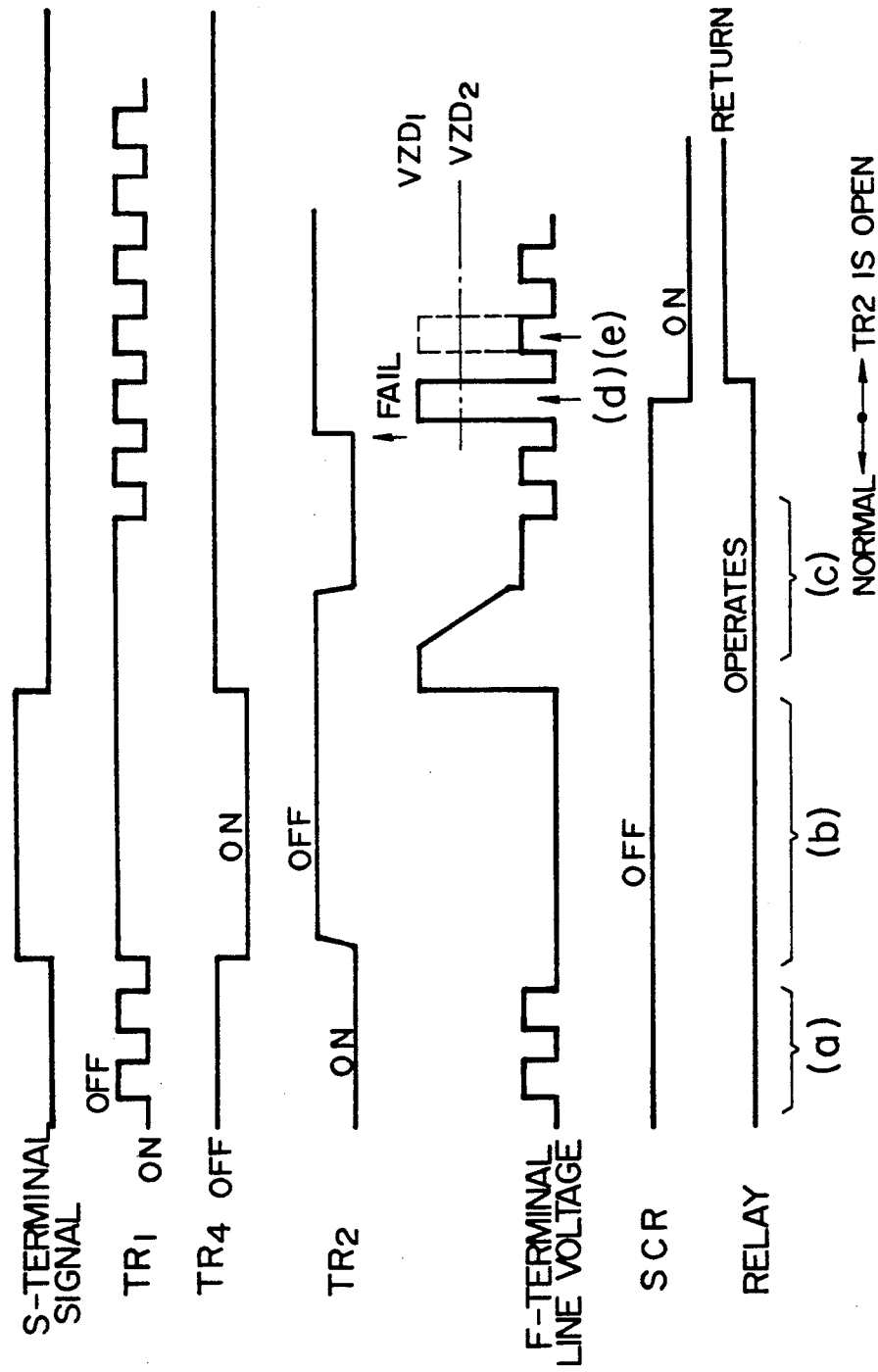
FIG. 2 is an operating waveform diagram of the embodiment of FIG. 1.

FIG. 2 shows a signal waveform indicative of the operation of the circuit.

In FIG. 1, the numeral 1 denotes a vehicle battery across (+) and (−) power supply lines 2 and 3 of which is connected an alternator 4 which has a stator coil 5 having terminals U, V and W are connected to a rectifying diode bridge 6 which has an output terminal connected to the (+) side of battery 1. The terminals U, V and W of stator coil 5 are also connected through auxiliary diodes 7 to an L-terminal line 11 of field coil 8.

The numeral 9 denotes a voltage regulator which has a transistor TR1 connected to an F-terminal line of field coil 8.

The numeral 10-3 denotes a relay coil which is rendered conductive and non-conductive by the turning on and off, respectively, of key switch 10 of the engine to thereby close and open normally open and closed contacts of relay contacts 10-1, 10-2. A series connected circuit of the normally open contact of a relay 10-1, transistor TR2 and free wheel diode D1 are connected in parallel across auxiliary diode 7 and voltage regulator 9. Normally closed contact b of relay contact 10-1 directly connects F-terminal line 12 and an anode of free wheel diode D1.

Transistor TR4 and Zener diode ZD1 for absorbing surge in field coil 8 are connected in parallel across normally open contact a of relay contact 10-1 and (−) power supply line 3 and also connected in parallel with voltage regulator 9 through relay contact 10-1.

The numeral 13 denotes a booster to increase the field current to suppress a reduction in vehicle body vibrations due to the occurrence of rough idling in the engine; 14, a constant-voltage circuit, the respective inputs of booster 13 and constant-voltage circuit 14 being connected through fuse 16 and relay contact 10-2 to (+) power supply line 2. Constant voltage circuit 14 outputs a constant voltage through constant voltage line 15. Booster 13 includes capacitors C1, C2, inductance L1, diode D2 and field effect transistor FET and has an output connected through diode D3 to the L-terminal line 11 of alternator 4.

As will be described later, booster 13 is driven by a pulse width control circuit 17 and a signal terminal S which commands an increase in the current in field coil 8.

Signal terminal S has one end connected to rough-idling detector 22 and a circuit 23 which generates a field coil current increase command signal when it detects rough idling, and the other end connected to the base of transistor TR5. Detector 22 and circuit 23 will be described in more detail later. The collector of transistor TR5 is connected to the base of transistor TR6 through resistor R3. The emitter of transistor TR6 is connected to the output of constant-voltage circuit 14 and its collector is connected in series with (−) power supply line 3 through resistor R4, diode D4 and capacitor C3. Capacitor C3 is connected in parallel with discharge resistor R5 and (+) terminal of capacitor C3 is connected to the base of transistor TR7.

The collector of transistor TR7 is connected to the base of transistor TR3 and constant voltage line 15 through resistor R6, and the emitter of transistor TR7 is connected to (−) power supply line 3. The collector of transistor TR3 is connected to the base of TR2 through resistor R1.

An operating signal is input from the collector of transistor TR6 to pulse width control circuit 17 and an operating signal is applied to the base of TR4 through resistor 2.

Comparator 20 detects excessive charging of the battery and the excessive terminal voltage of the voltage regulator. The junction point between resistors R7 and R8 connected in series with constant voltage line 15 is connected to the inverted input terminal of comparator 20. A reference voltage corresponding to the predetermined battery voltage is input to that inverted input terminal. The battery voltage is input to the noninverted input terminal of comparator 20 through relay contact 10-2, and the junction point of resistors 9, 10. The difference between voltages across Zener diodes ZD1 and ZD2 is input to the non-inverted input terminal of comparator 20. The output of comparator 20 is connected to contact voltage line 15 and the gate of thyristor 21 through resistor R11. The anode of thyristor 21 is connected to the output of booster 13 through resistor R12.

The L-terminal line 11 of alternator 4 is connected through a series connected circuit of resistor R12 and light emitting diode 18 to the base of transistor TR8, the collector of which is connected to relay coil 10-3, the other end of which is impressed with a relay operating (+) power supply through key switch 10.

The anode of Zener diode DZ1 is connected through a series circuit of Zener diode ZD2 and diode D5 to resistor R10. The cathode of diode D5 and the collector of transistor TR7 are connected through diode D6.

The operation of the embodiment will be described below.

First, assume that the circuit of the apparatus is normal.

When key switch 10 is switched on to thereby start the engine and rotate alternator 4, substantially the battery voltage is generated on L-terminal line 11 to light up light emitting diode 18 and to cause a base current to flow through transistor TR8 to render same conductive to thereby energize relay coil 10-3. Thus, relay contacts 10-1, 10-2 are operated to close the respective normally open contacts and open the respective normally closed contacts.

Thus, constant voltage circuit 14 operates, and a transistor TR3 base current flows through resistor R6 and transistor TR3 to thereby render transistors TR3 and TR2 conductive. Under such condition, when transistor TR1 of voltage regulator 9 is on, a current is amplified by TR1 to flow through current auxiliary diode 7, L-terminal 11 and field coil 8. When TR1 is off, the surge energy stored in field coil 8 flows as a recirculating current through the normally closed contact of a relay contact 10-1, transistor TR2 and free wheel diode D1.

If no rough idling is occurring in this normal mode, the signal level on signal terminal S is low and there are no signals to command an increase in the field current, so that transistors TR5, TR6, TR7 and TR4 are off (this operation is shown in the phase of FIG. 2(a)).

When rough idling occurs in the engine under such conditions, a signal indicative of the detection of such rough idling generates a high level signal (field current increase command signal) from signal terminal S at appropriate timing. The high level signal is applied to the base of transistor TR5 to thereby render transistors TR5 and TR6 conductive and the output of constant voltage circuit 14 is applied to pulse width control circuit 17 to thereby operate same and booster 13. Therefore, the L-terminal voltage of alternator 4 increases (to about 40 volts). At this time, voltage regulator 9 is off and transistor TR6 is on, so that transistors TR4 and TR7 are on.

TR7 is then turned on, so that transistors TR3 and TR2 are turned off. Thus, the current flowing through field coils 8 is amplified by transistor TR4 to flow through transistor TR4. The increase in the field current serves to increase the battery voltage supplied by diode bridge 6 and the current supplied by diode bridge 6. As a result that the field current of the alternator increases, the load torque on the alternator increases. Booster 13 functions such that a large current flows speedily in consideration of the inductance of field coil 8.

By fluctuations in the load on the alternator, the alternator body swings due to reaction. Engine vibrations generated during rough idling are canceled by the swing of the alternator and hence the vehicle body vibrations are suppressed. Since the mechanism of suppressing the vehicle body vibrations is described above, further description thereof will be omitted here (this operation is shown by the phase of FIG. 2(*b*)).

When rough idling disappears and the signal level on the signal terminal S becomes low, transistors TR5, TR6 are turned off and the booster 13 and transistor TR4 stop. Transistor TR1 of voltage regulator 9 is maintained off for a predetermined time after rough idling has disappeared. It takes time for capacitor C3 to discharge through resistor R5, so that transistor TR7 is not immediately turned off.

Therefore, transistors TR3 and TR2 are still off and the surge in field coil 8 flows through Zener diode ZD1 and is reserved at the blocking voltage of Zener diode ZD1 and then attenuated. Transistor TR2 is not turned on until transistor TR7 is turned off and the attenuated surge current flows through the normally open contact a of relay contact 10-1, transistor TR2 and free wheel diode D1 as before rough idling (this operation is shown by the phase of FIG. 2(*c*)).

Next assume that an abnormality has occurred in the vehicle body vibration reducing apparatus.

I. If the components including capacitors C1, C2 and field effect transistor FET of the booster 13 are short-circuited fuse 16 fuses away to protect the circuit. Diode D3 prevents a decrease in the voltage on L-terminal line 11 at this time. In this way, the proper generating function of alternator 4 is maintained even if booster fails.

II. When transistor TR4 for causing the field coil increasing current to flow to reduce vehicle body vibrations or surge absorption Zener diode ZD1 short-circuits, the current flowing through field coil 8 becomes maximum even if the booster 13 is at rest. Therefore, the generated voltage increases and the battery voltage exceeds the control voltage (15 volts) of voltage regulator 9.

When such situation occurs, an increase in the battery voltage is detected by resistors R7–R10 and comparator 20. In comparator 20, the voltage set by resistors 7, 8 (so as to be an upper voltage limit for the voltage regulator) is input to the inverted-input terminal of comparator 20 and the battery voltage is input as a detected voltage to the non-inverted input terminal through resistors R9, R10. When the detected voltage determined by the ratio in resistance of resistor R9 to R10 exceeds the predetermined voltage value, the output of comparator 20 becomes high with the result that a firing current flows from constant-voltage circuit 14 through resistor 11 to the gate of thyristor 21 to render same conductive such that the anode voltage of the thyristor becomes substantially 0 volts. Therefore, light emitting diode 18 and relay transistor TR8 are turned off.

It is preferable that a circuit failure of the vehicle body vibration reducing apparatus is displayed, if any, as light emitting diode 18 is turned off.

When transistor TR8 is turned off, relay coil 10-3 is deenergized, so that relay contact 10-2 is opened and contact 10-1 is returned to the normally closed contact b. Therefore, Zener diode ZD1 or transistor TR4 in a short-circuited state is disengaged from the F-terminal line of the alternator, so that the disadvantage that a short-circuiting current flows from L-terminal line 11 of the alternator through field coil 8 is prevented. Once thyristor 21 is rendered conductive, it continuous to be conductive until engine is stopped or the key switch is turned off to thereby prevent the occurrence of the inconvenience that the battery voltage is excessively charged due to the failure.

Since the battery voltage may increase during the operation of booster 13 or surge absorption Zener diode ZD1, diode D6 serves to prevent the detection of an increase in the battery voltage by comparator 20.

III. When transistor TR2 in the free wheel diode circuit fails and opens, free wheel diode D1 does not function even if voltage regulator 9 operates at a normal time, so that the F-terminal line voltage of the alternator increases to the blocking voltage of Zener diode ZD1 as shown in FIG. 2(*d*). If no protective measures are taken at this time, the frequency of use of Zener diode ZD1 increases, so that ZD1 is heated and finally fails.

In order to prevent this failure, the present embodiment takes the following measures. Zener diode ZD2 is provided in parallel with Zener diode ZD1. The blocking voltage of ZD2 is set so as to be less than the blocking voltage VZ1 of ZD1 and that the voltage difference (VZ1−VZ2) is set such that it is higher than the inverted-input terminal voltage of comparator 20. Thus, when the F-terminal line voltage increases by the opening of transistor TR2, the voltage difference (VZ1−VZ2) exceeds the inverted-input terminal voltage of comparator 20, so that operations similar to those described in the item III are performed. Thus relay contact 10-2 is opened and contact 10-1 is returned to the normally closed contact b side. Free wheel diode D1 is connected through normally closed contact 10-1 from F-terminal line, so that the surge voltage generated during the operation of the voltage regulator flows as a recirculating current through free wheel diode D1 and hence the F-terminal line voltage decreases as shown in FIG. 2(*e*).

In this way, Zener diode ZD1 is prevented from deteriorating.

As the blocking voltage of Zener diode ZD1 is larger, surge absorption is speedier and a rise in the field current is rapider. However, since the voltage is high, high voltage is frequently applied to the components of voltage regulator 9 to thereby deteriorate them at increased speed.

Figure 3:
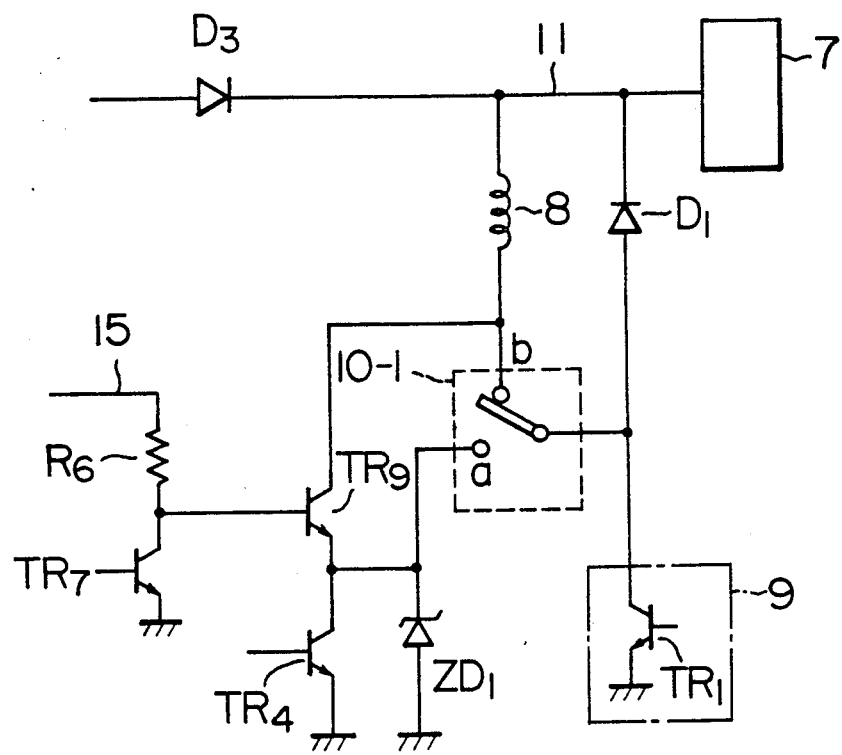
FIG. 3 is a partial circuit diagram of a modification of the FIG. 1 embodiment.

FIG. 3 shows a modification of the FIG. 1 embodiment which is the same of the FIG. 1 embodiment excepts that transistor TR9 is used in place of transistors TR2, TR3 of the surge absorption circuit and that field coil 8 and free wheel diode D1 are replaced with each other in position.

In transistor TR9 of the modification, its collector is connected across the normally closed contact b of relay contact 10-1 and field coil 8. The emitter of transistor TR9 is connected to the collector of transistor TR4 and also to the junction point of normally open contact a of relay contact 10-1 and Zener diode ZD1.

Thus, when the key switch is turned on and relay contact 10-1 is on the normally open contact a side, a field current flows through L-terminal line 11 of the alternator, field coil 8, transistor TR9 and normally open contact a when transistor TR1 of voltage regulator 9 is on. When TR1 is off, the current due to the surge voltage of field coil 8 at that time flows as a recirculating current through field coil 8, transistor TR9, the normally open contact a of relay contact 10-1 and free wheel diode D1.

When transistor TR4 is turned on as when rough idling occurs, the field coil increasing current for reducing vehicle body vibrations flows through transistors TR9 and TR4.

According to such construction, both the functions of transistors TR2 and TR3 may be replaced with that of single transistor TR9, so that the number of parts used and the circuit construction are simplified advantageously.

Figure 4:
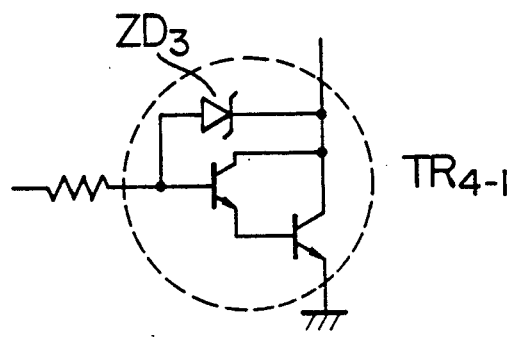
FIG. 4 is a partial circuit diagram of a modification of the FIG. 1 embodiment.

FIG. 4 shows means for coping with possible opening of Zener diode ZD1 of FIG. 1. As shown in FIG. 4, the present embodiment uses a Darlington-connected transistor TR4 - 1 comprising Zener diode ZD3 having a breakdown voltage higher than the blocking voltage of Zener diode ZD1 in place of transistor TR4. Zener diode ZD3 is connected across the base and collector of a first transistor of the Darlington connection, as shown. By such construction, ZD3 functions in place of Zener diode ZD1 when same is opened.

Figure 5:
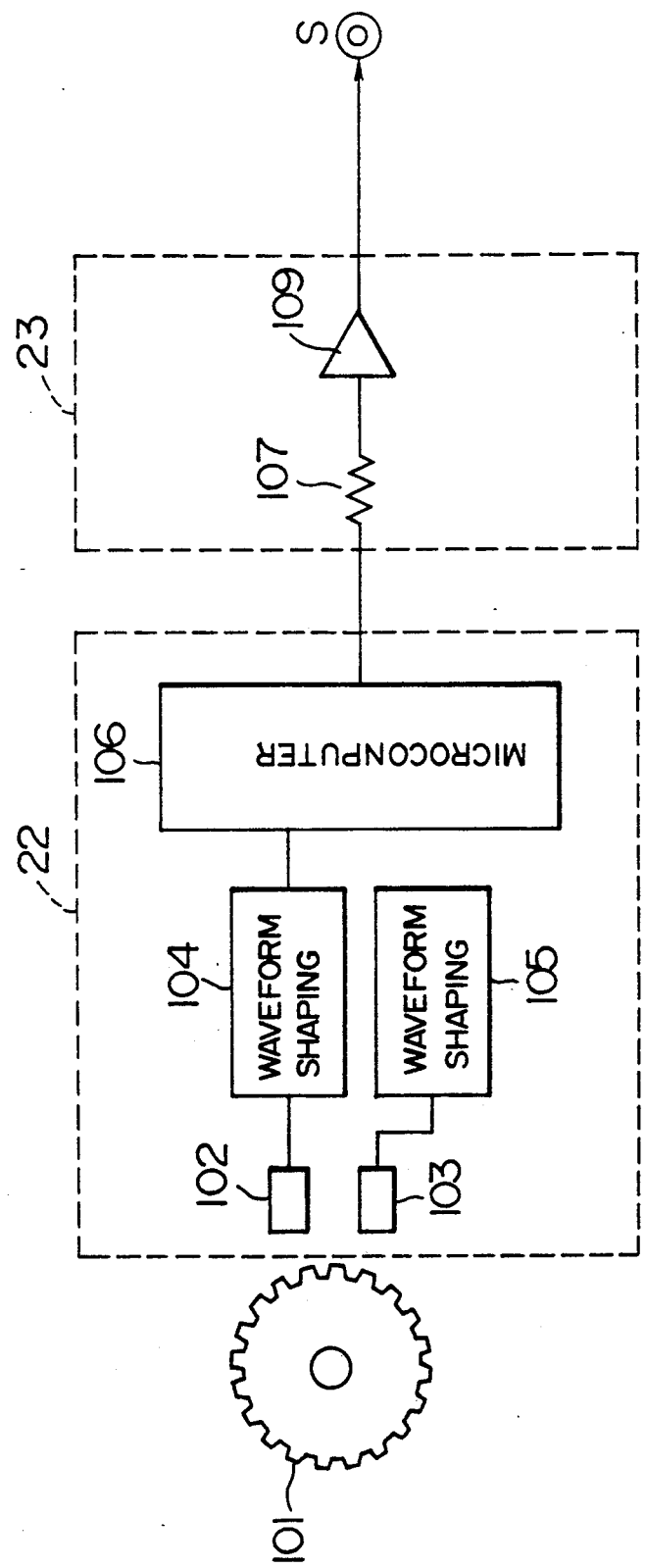
FIG. 5 is a circuit diagram indicative of a specific embodiment of a rough idling detector and a field current increase command circuit of the FIG. 1 embodiment.

The structure and operation of rough idling detector 22 and field coil current increase command circuit 23 will be described with reference to FIG. 5 in which the numeral 101 denotes a ring gear which is directly connected to the crankshaft of the engine and rotated synchronously with engine rotation. Electromagnetic pickups 102, 103 each are disposed in the vicinity of the ring gear teeth and generate a pulse each time ring gear 101 passes by pickups 102, 103. Pickup 102 detects the engine speed while pickup 103 detects an engine reference position, for example, the top dead Center. The pulse outputs from the respective pickups 102 and 103 are input to corresponding waveform shaping circuits 104, 105 where they are adjusted to a predetermined shaped waveform. Microcomputer 106 counts pulse signals from waveform shaping circuit 104 to calculate the engine speed and to detect fluctuations in the engine rotation. If rotational fluctuations arrive at a predetermined value or more, the computer determines that rough idling has occurred and generates a command signal to increase the field current in the alternator a predetermined time after the waveform shaping circuit 105 has generated a top dead center signal. The predetermined time is experimentally determined beforehand such that the generation of vibrations of the alternator by an increase in the field current cancels the generation of rough idling. Detection of rotation fluctuations is performed by detecting a change in the rotational speed with time or a change in the rotational acceleration with time. The command signal from microcomputer 106 is changed by resistor 107 to a predetermined level, amplified by buffer amplifier 109 and delivered to the S-terminal.

What is claimed is:

1. A protective circuit in apparatus for reducing vehicle body vibrations due to rough idling of a vehicle engine, comprising:

a generator attached to the vehicle engine and including a voltage regulator for controlling a field winding current so as to output a predetermined voltage to a battery;

means for detecting the occurrence of the rough idling of the engine on the basis of at least one of a change in the rotational speed of the engine and a change in the vibrations of the engine;

means responsive to the detection of the rough idling for generating a command signal to command an increase in the field winding current;

means responsive to the command signal for generating a high voltage higher than the predetermined voltage for a predetermined time;

first switching means responsive to the command signal for applying a voltage generated by said high voltage generating means to the field winding to increase the field current and hence to increase a load torque on said generator during which time the voltage regulator is at rest;

means for detecting the voltage of the battery when there is no command signal;

means for comparing the detected battery voltage and a predetermined reference value and for generating a changeover signal when the detected battery voltage exceeds the reference value; and second switching means responsive to the changeover signal from said comparing means for interrupting the connection of said first switching means to the field winding.

2. A protective circuit according to claim 1, further comprising:

a free wheel diode circuit connected in parallel with the field winding for absorbing a surge current generated in the field winding; and third switching means responsive to the command signal for interrupting said free wheel diode circuit, said second switching means being operative to interrupting the connection of said first switching means to the field winding and simultaneously connecting said free wheel diode circuit to the field winding.

3. A protective circuit in apparatus for reducing vehicle body vibrations due to rough idling of a vehicle engine, comprising:

a generator attached to the vehicle engine and including a voltage regulator for controlling a field winding current so as to output a predetermined voltage to a battery;

means for detecting the occurrence of the rough idling of the engine on the basis of at least one of a change in the rotational speed of the engine and a change in the vibrations of the engine;

means responsive to the detection of the rough idling for generating a command signal to command an increase in the field winding current;

means responsive to the command signal for generating a high voltage higher than the predetermined voltage for a predetermined time;

first switching means responsive to the command signal for applying a voltage generated by said high voltage generating means to the field winding to increase the field current and hence a load torque on said generator during which time the voltage regulator is at rest;

means for detecting the voltage of the voltage regulator when there is no command signal;

means for comparing the detected regulator voltage and a predetermined reference value and for generating a changeover signal when the detected regulator voltage exceeds the reference value; and second switching means responsive to the changeover signal from said comparing means for interrupting the connection of said first switching means to the field winding.

4. A protective circuit according to claim 3, further comprising:

a surge absorbing element for absorbing a surge current generated in the field winding after high voltage is applied across the field winding for the predetermined time; and wherein said second switching means is operative to interrupt the connection of said first switching means to the field winding and to simultaneously disconnect said surge absorbing element from the field winding.

5. A protective circuit according to claim 4, further comprising:

a free wheel diode circuit connected in parallel with the field winding for absorbing a surge current generated in the field winding;

third switching means responsive to the command signal for interrupting said free wheel diode circuit;

means for detecting the battery voltage when there is no command signal;

means for comparing the detected battery voltage and a predetermined reference value and for generating a second changeover signal when the detected battery voltage exceeds the reference value; and second switching means responsive to the second changeover signal from said comparing means for interrupting the connection of said first switching means to the field winding and for connecting said free wheel diode circuit to said field winding.

* * * * *